United States Patent
Ishikawa et al.

[11] Patent Number: 5,934,771
[45] Date of Patent: Aug. 10, 1999

[54] ANTILOCK BRAKE CONTROL SYSTEM IN VEHICLE

[75] Inventors: Teruyasu Ishikawa, Osaka; Isao Matsuno, Nagano, both of Japan

[73] Assignees: NEC Home Electronics Ltd., Osaka; Nissin Kogyo Co., Ltd., Ueda, both of Japan

[21] Appl. No.: 08/878,822

[22] Filed: Jun. 19, 1997

[30] Foreign Application Priority Data

Jun. 19, 1996 [JP] Japan .................................. 8-158541

[51] Int. Cl.⁶ ........................................................ B60T 8/32
[52] U.S. Cl. .................... 303/163; 188/181 C; 303/171; 303/176; 303/119.1
[58] Field of Search ................................ 303/119.1, 163, 303/165, 169, 171, 199, 173, 174, 176, 177, 121, 150, 146, 149, 148, 147, 20; 188/181 C, 181 A; 701/71, 73, 74, 78, 80, 82, 83

[56] References Cited

U.S. PATENT DOCUMENTS

| | | | |
|---|---|---|---|
| 4,682,295 | 7/1987 | Kubo | 303/174 |
| 4,950,037 | 8/1990 | Kopper et al. | 303/166 |
| 5,210,690 | 5/1993 | Kageyama et al. | 303/163 |
| 5,358,318 | 10/1994 | Ikeda et al. | 303/173 |
| 5,494,345 | 2/1996 | Inagaki et al. . | |

FOREIGN PATENT DOCUMENTS

| | | |
|---|---|---|
| 6-144194 | 5/1994 | Japan . |
| 6-144195 | 5/1994 | Japan . |
| 7-117653 | 5/1995 | Japan . |

*Primary Examiner*—Douglas C. Butler
*Attorney, Agent, or Firm*—Nikaido, Marmelstein, Murray & Oram LLP

[57] ABSTRACT

An antilock brake control system in a vehicle includes a PID calculating device for carrying out a PID calculation based on a deviation between a target slip rate determined based on a presumed vehicle speed and a slip rate, so that the operation of braking fluid pressure regulating device is controlled based on the result of the calculation in the PID calculating device. In the antilock brake control system, a braking pressure control mode is decided based on the result of comparison of a PID calculation value calculated in the PID calculating device with a predetermined threshold value, so that the operation of braking fluid pressure regulating device is controlled in such control mode. When the amount of variation in PID calculation value within a predetermined time exceeds a predetermined value, a control mode different from a control mode decided from a current PID calculation value is selected. Thus, the occurrence of an excessive control and a control delay can be prevented and moreover, the control of the braking pressure can be performed in a simple structure enabling the use of an inexpensive on-off operated solenoid valve.

7 Claims, 17 Drawing Sheets

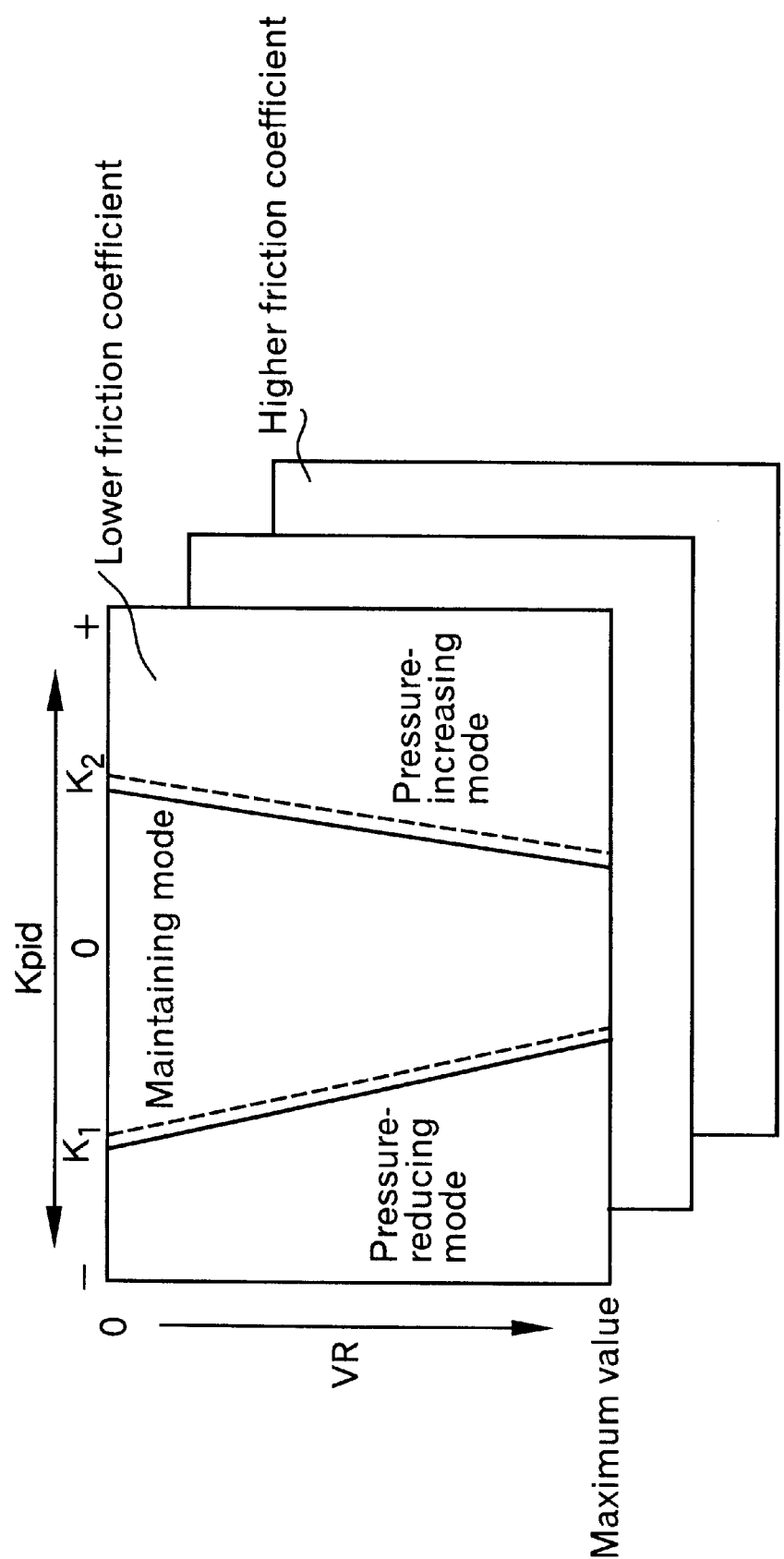

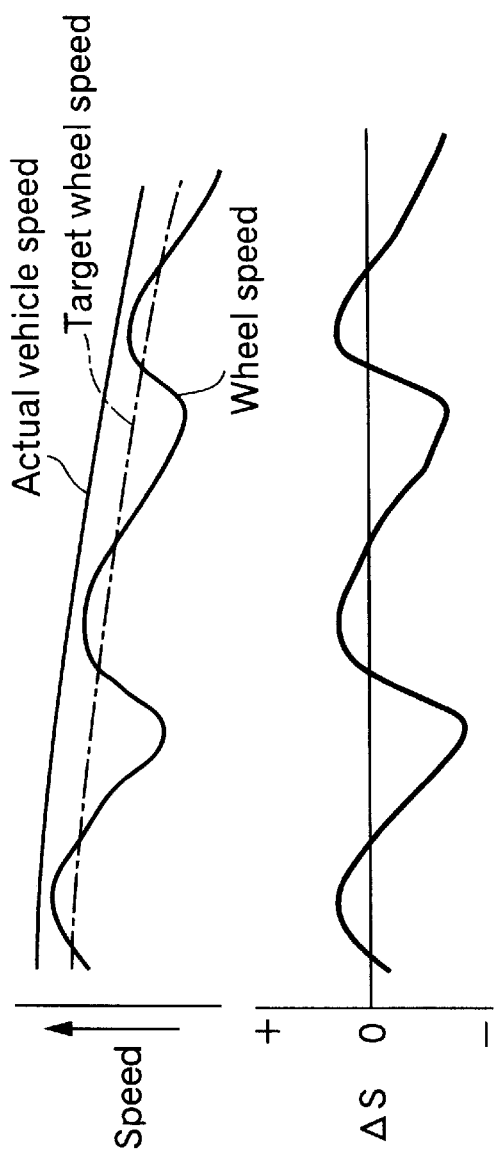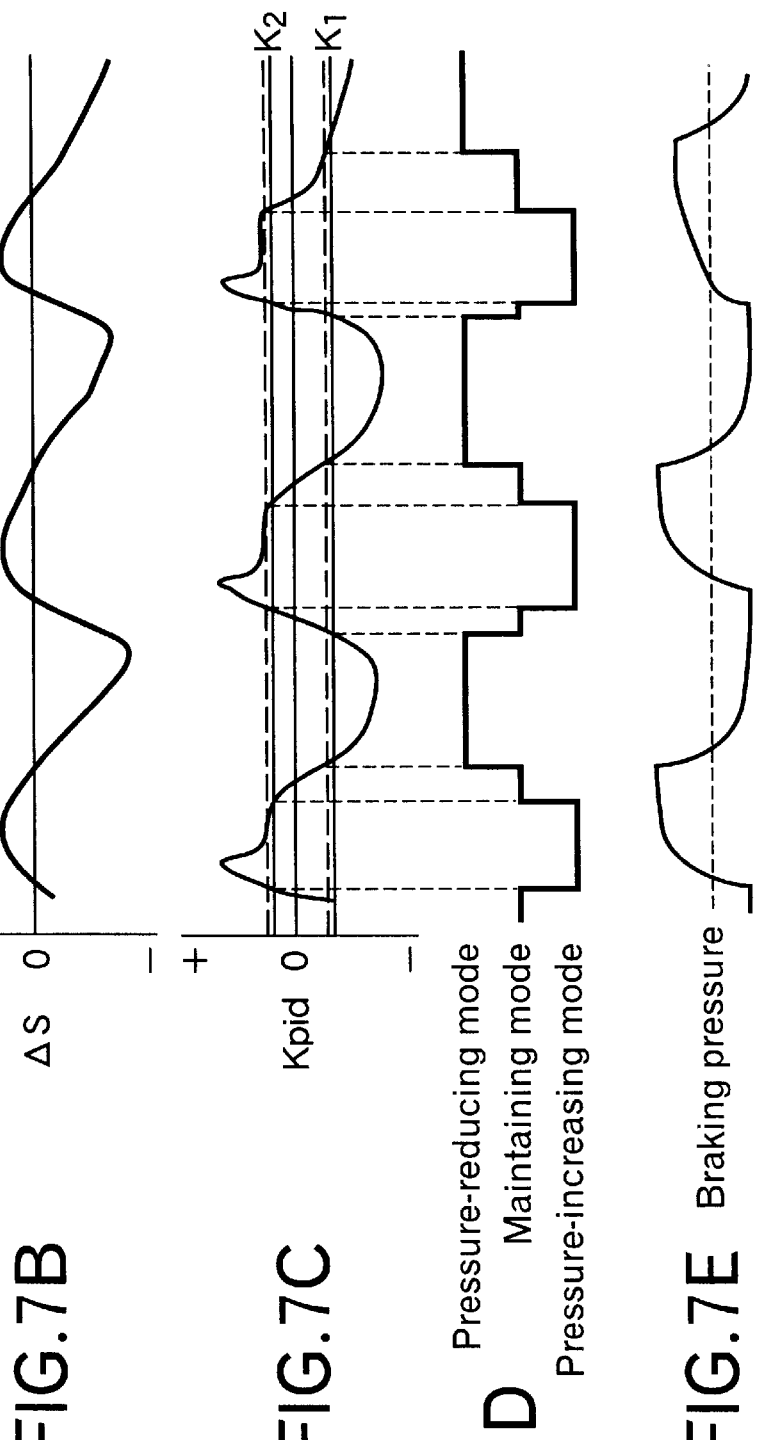
FIG.7A
FIG.7B
FIG.7C
FIG.7D
FIG.7E

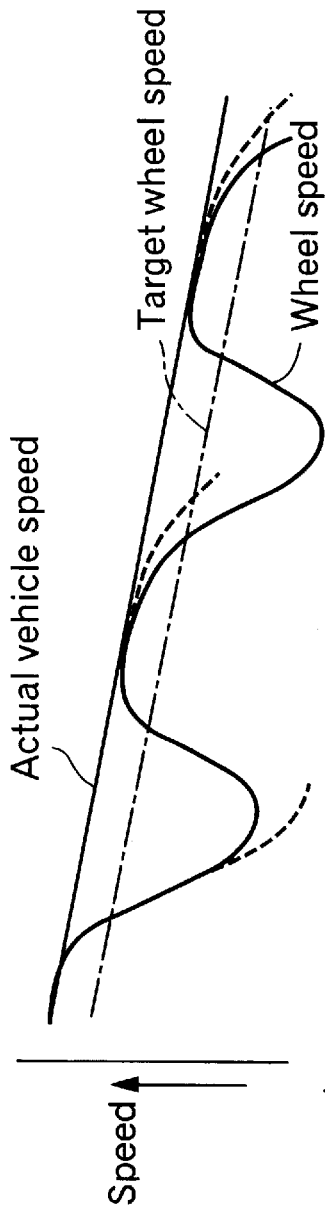
FIG.8A
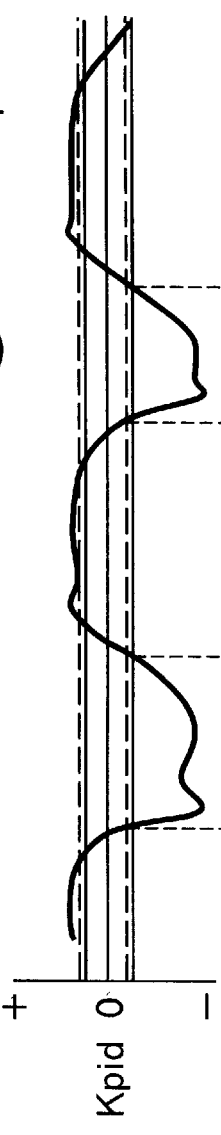
FIG.8B
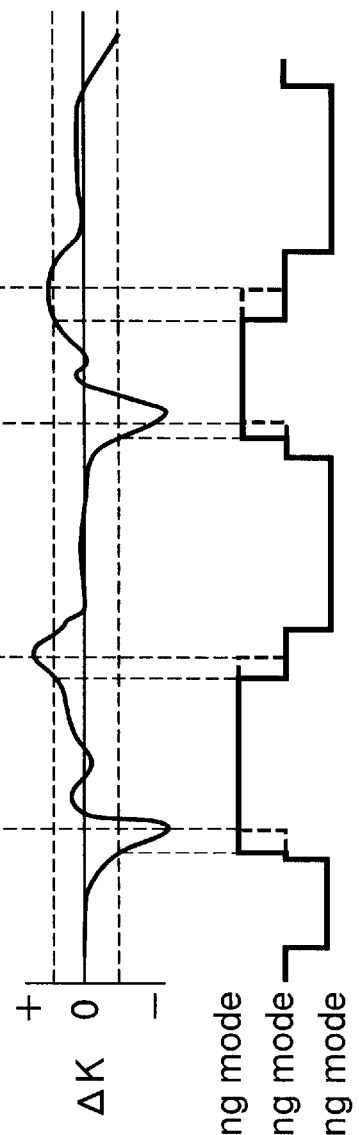
FIG.8C
FIG.8D

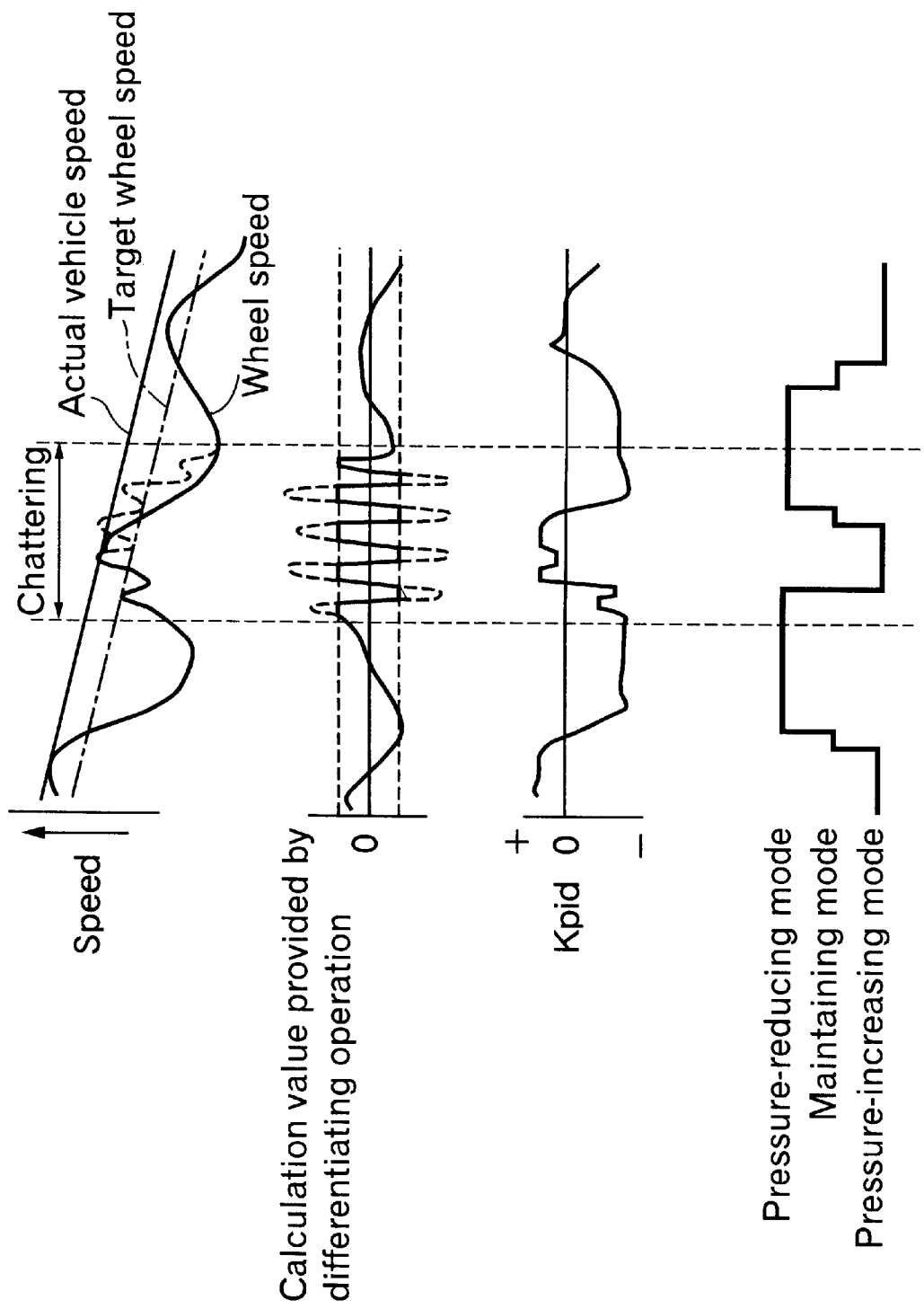

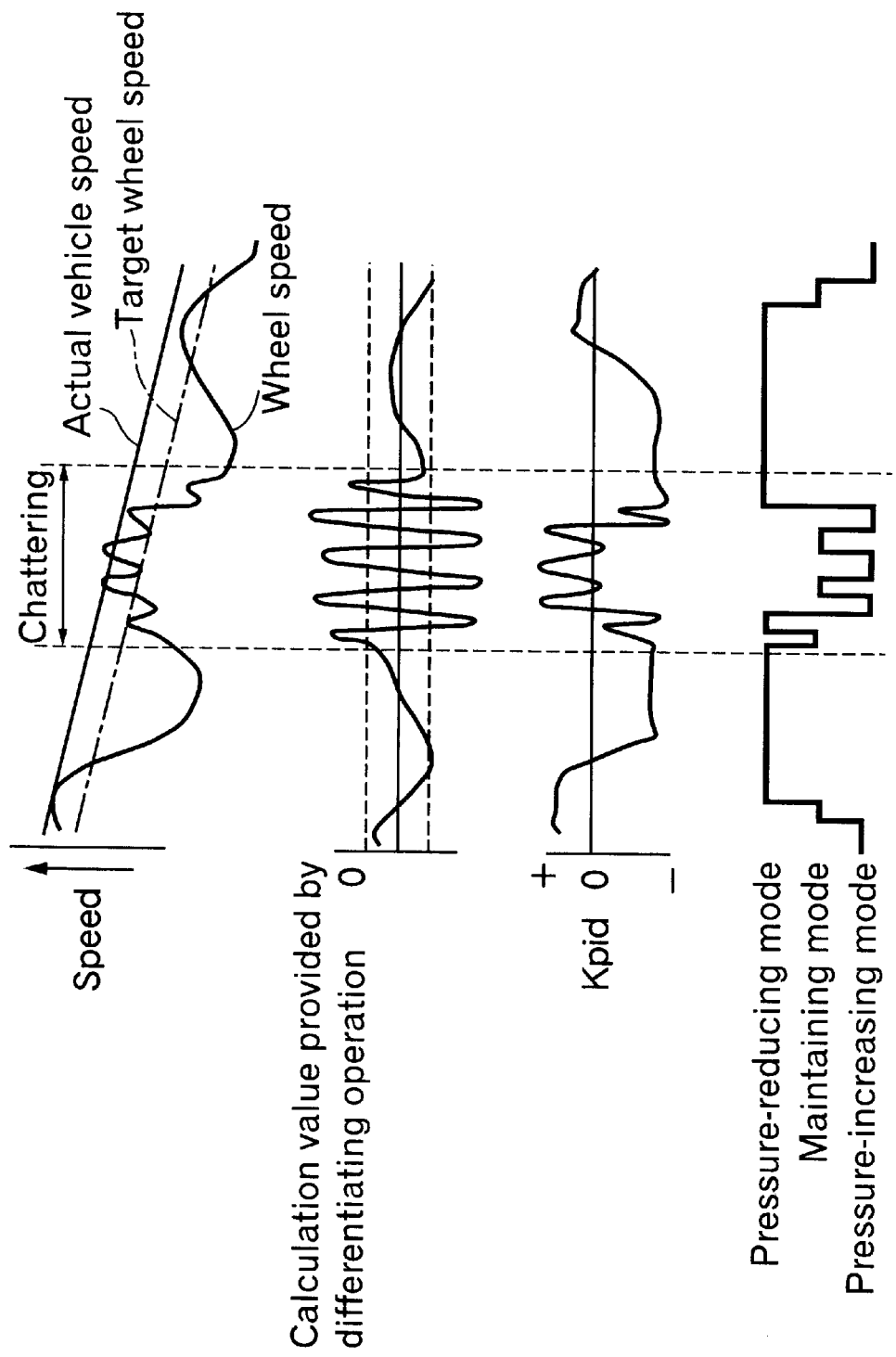

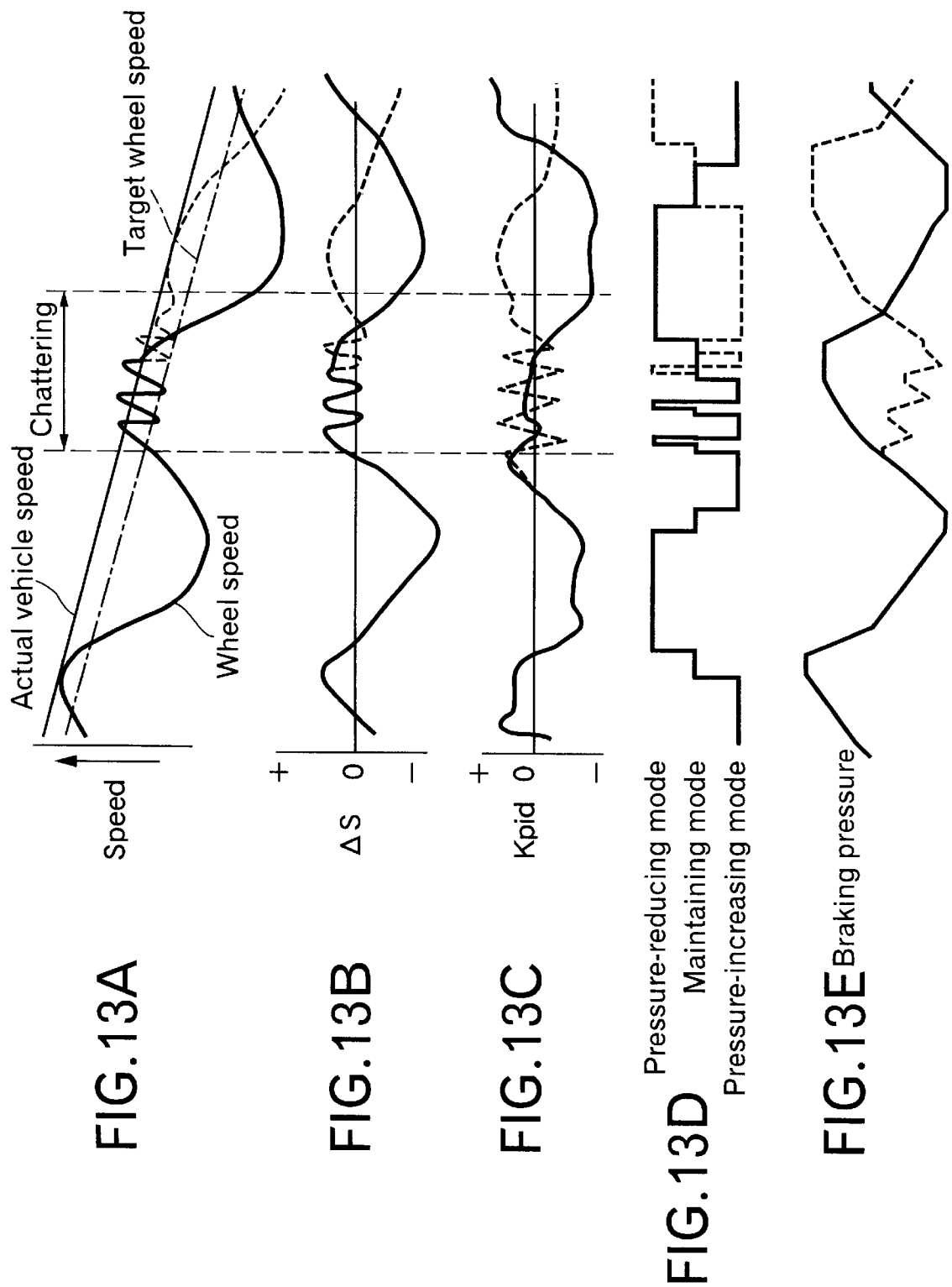

ANTILOCK BRAKE CONTROL SYSTEM IN VEHICLE

BACKGROUND OF THE INVENTION

1. Field of the Invention

The present invention relates to an antilock brake control system in a vehicle, including wheel speed detecting means for detecting a wheel speed, a vehicle speed presuming means for presuming a vehicle speed based on the wheel speed detected by the wheel speed detecting means, a slip rate calculating means for calculating a slip rate based on the wheel speeds detected by the wheel speed detecting means and the presumed vehicle speed determined in the vehicle speed presuming means, a target slip rate determining means for determining a target slip rate based on the presumed vehicle speed determined in the vehicle speed presuming means, a deviation calculating means for calculating a deviation between the target slip rate determined in the target slip rate determining means and the slip rate calculated in the slip rate calculating means, and a PID calculating means for carrying out a PID calculation based on the deviation determined in the deviation calculating means, the result of a calculation in the PID calculating means being used to control the operation of a braking fluid pressure regulating means.

2. Description of the Related Art

Such a control system is conventionally known, for example, from Japanese Patent Application Laid-open Nos. 6-144195 and 7-117653.

However, the above known control system is arranged to linearly control the braking pressure based on the result of the calculation in the PID calculating means and hence, an expensive linear solenoid or the like is required as a braking pressure controlling actuator, and a common inexpensive on-off operated solenoid valve cannot be used as such a braking pressure controlling actuator. Therefore, in order to provide a reduction in cost, it is desired that an antilock brake control can be performed in a simple structure using an inexpensive on-off operated solenoid valve. Moreover, even if the arrangement is such that the antilock brake control is performed in a simple structure with the on-off valve, it is necessary to prevent the occurrence of an excessive control or a control delay.

SUMMARY OF THE INVENTION

Accordingly, it is an object of the present invention to provide an antilock brake control system in a vehicle, wherein the excessive control and control delay is prevented from occurring and moreover, the control of a braking pressure can be performed in a simple structure enabling the use of an inexpensive on-off operated solenoid valve.

To achieve the above object, according to the present invention, there is provided an antilock brake control system in a vehicle, including wheel speed detecting means for detecting a wheel speed, a vehicle speed presuming means for presuming a vehicle speed based on the wheel speed detected by the wheel speed detecting means, a slip rate calculating means for calculating a slip rate based on the wheel speed detected by the wheel speed detecting means and the presumed vehicle speed in the vehicle speed presuming means, a target slip rate determining means for determining a target slip rate based on the presumed vehicle speed determined in the vehicle speed presuming means, a deviation calculating means for calculating a deviation between the target slip rate determined in the target slip rate determining means and the slip rate calculated in the slip rate calculating means, and a PID calculating means for carrying out a PID calculation based on the deviation determined in the deviation calculating means, a result of a calculation in said PID calclulating means being used to control an operation of a braking liquid pressure regulating means, wherein the antilock brake control system further includes a control mode deciding means for deciding a control mode for controlling a braking pressure based on a result of comparison of a PID calculation value determined in the PID calculating means with a predetermined threshold value to control the operation of the braking liquid pressure regulating means, and for selecting another control mode different from a control mode decided from a current PID calculation value, when an amount of variation in the PID calculation value within a predetermined time exceeds a predetermined value.

With such arrangement, the braking pressure control mode is decided based on the result of comparison of the PID calculation value determined in the PID calculating means with the predetermined threshold value to control the operation of the braking liquid pressure regulating means. Thus, a relatively inexpensive on-off operated solenoid valve can be used as a component of the braking liquid pressure regulating means in comparison with the system for conducting linear braking pressure control based on the PID calculation value, and the control of the braking pressure can be performed in a simple structure. When the amount of variation in PID calculation value within the predetermined time exceeds the predetermined value, a control mode different from that decided from the current PID calculation value is selected. Thus, it is possible to perform an appropriate antilock brake control free from an excessive control and a control delay.

The above and other objects, features and advantages of the invention will become apparent from the following description of the preferred embodiment taken in conjunction with the accompanying drawings.

BRIEF DESCRIPTION OF THE DRAWINGS

FIG. 6 is a diagram illustrating a map for deciding a control mode;

FIGS. 7A, 7B, 7C, 7D and 7E are timing charts for explaining the selection of a control mode;

FIGS. 8A, 8B, 8C and 8D are timing charts for explaining the change of the control mode;

FIGS. 12A and 12B are diagrams illustrating a timing chart when a calculation value provided by a differentiating operation has been limited by a limit value, in contrast with that when the calculation value has not been limited; and FIGS. 13A, 13B, 13C, 13D and 13E are diagrams illustrating a timing chart when the PID calculation value has been filtered in a low-pass filter, in contrast with that when the PID calculation value has not been filtered.

DETAILED DESCIPTION OF THE PREFERRED EMBODIMENT

The present invention will now be described by way of an embodiment applied to a motorcycle with reference to FIGS. 1 to 13.

Figure 1:
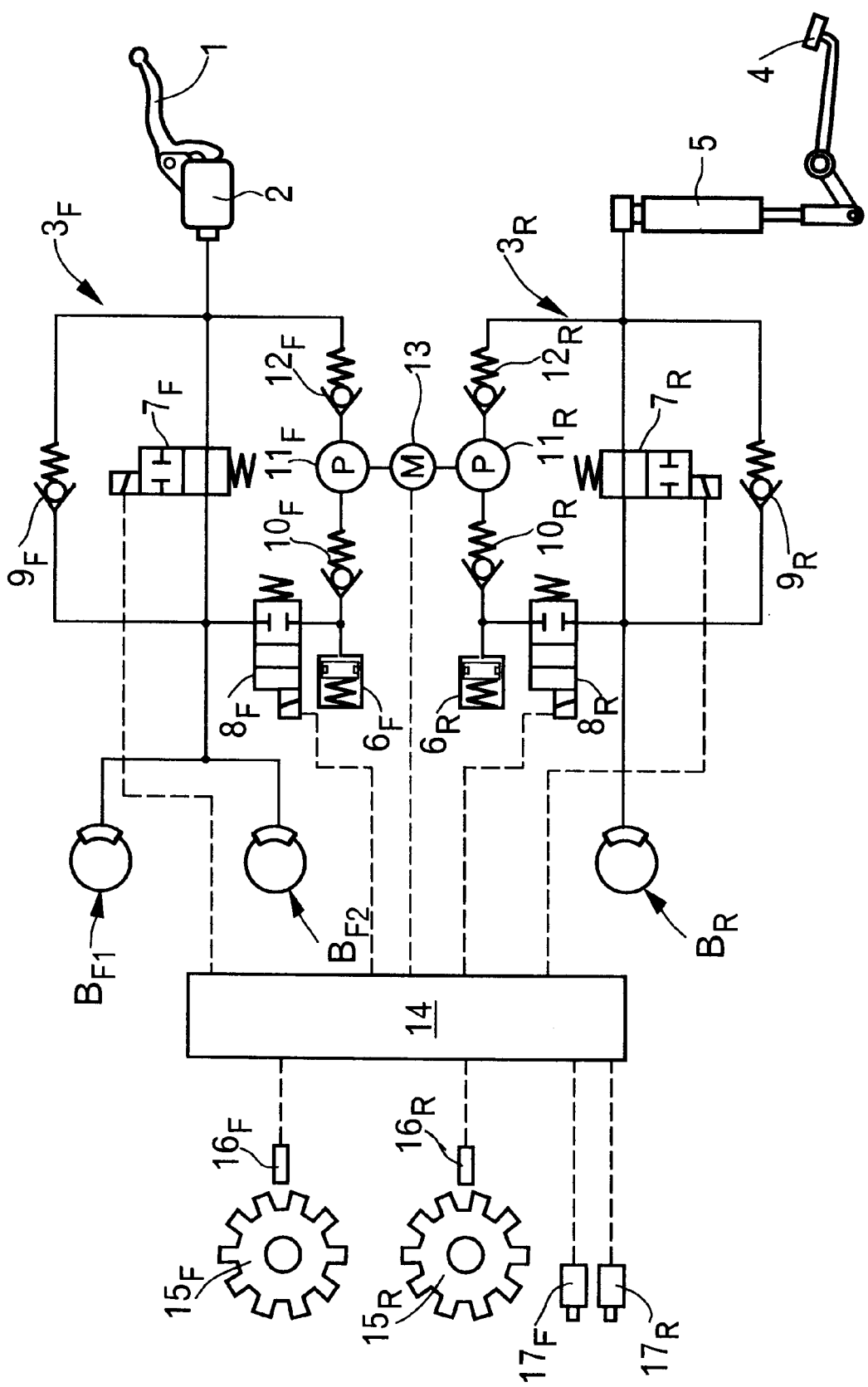
FIG. 1 is an illustration of the entire arrangement of a brake system in a motorcycle.

Referring first to FIG. 1, a braking liquid pressure regulating means $3_F$ is provided between a master cylinder 2 adapted to output a liquid pressure depending upon the operation of a brake lever 1 and a pair of left and right front wheel brakes $B_{F1}$ and $B_{F2}$ mounted to a front wheel of a motorcycle. The braking liquid pressure regulating means $3_F$ is capable of regulating braking liquid pressures for both the front wheel brakes $B_{F1}$ and $B_{F2}$. A rear wheel braking liquid pressure regulating means $3_R$ is provided between a master cylinder 5 adapted to output a liquid pressure depending upon the operation of a brake pedal 4 and a rear wheel brake $B_R$ mounted on a rear wheel of the motorcycle, and is capable of regulating a braking liquid pressure for the rear wheel brake $B_R$.

The braking liquid pressure regulating means $3_F$ includes a reservoir $6_F$, a normally-opened solenoid valve $7_F$ mounted between both the front wheel brakes $B_{F1}$ and $B_{F2}$ and the master cylinder 2, a normally-closed solenoid valve $8_F$ mounted between the reservoir $6_F$ and both the front wheel brakes $B_{F1}$ and $B_{F2}$, a check valve $9_F$ connected parallel to the normally-opened solenoid valve $7_F$ to permit a braking liquid to flow from both the front wheel brakes $B_{F1}$ and $B_{F2}$ toward the master cylinder 2, and a return pump $11_F$ having an inlet connected to the reservoir $6_F$ through an intake valve $10_F$ and an outlet connected to the master cylinder 2 through a discharge valve $12_F$.

The braking liquid pressure regulating means $3_R$ is constructed in the same manner as is the front wheel braking liquid pressure regulating means $3_F$, and includes a reservoir $6_R$, a normally-opened solenoid valve $7_R$, a normally-closed solenoid valve $8_R$, a check valve $9_R$, an intake valve $10_R$ a return pump $11_R$, and a discharge valve $12_R$.

Moreover, the return pump $11_F$ of the braking fluid pressure regulating means $3_F$ and the return pump $11_R$ of the braking liquid pressure regulating means $3_R$ are driven by a common motor 13.

Controlled by a control unit 14 are the normally-opened and closed solenoid valves $7_F$ and $8_F$ of the braking liquid pressure regulating means $3_F$, the normally-opened and closed solenoid valves $7_R$ and $8_R$ of the braking liquid pressure regulating means $3_R$ and the motor 13. Inputted to the control unit 14 are output signals from a front wheel speed sensor $16_F$ fixedly disposed on an opposed relation to a side of a pulser gear $15_F$ fixed to the front wheel, a rear wheel speed sensor $16_R$ fixedly disposed on an opposed relation to a side of a pulser gear $15_R$ fixed to the rear wheel, a front wheel brake switch $17_F$ and a rear wheel brake switch $17_R$. The control unit 14 controls the operations of the normally-opened solenoid valves $7_F$ and $7_R$, the normally-closed solenoid valves $8_F$ and $8_R$ and the motor 13 in accordance with the outputs from the sensors $16_F$ and $16_R$ and the switches $17_F$ and $17_R$.

Figure 2:
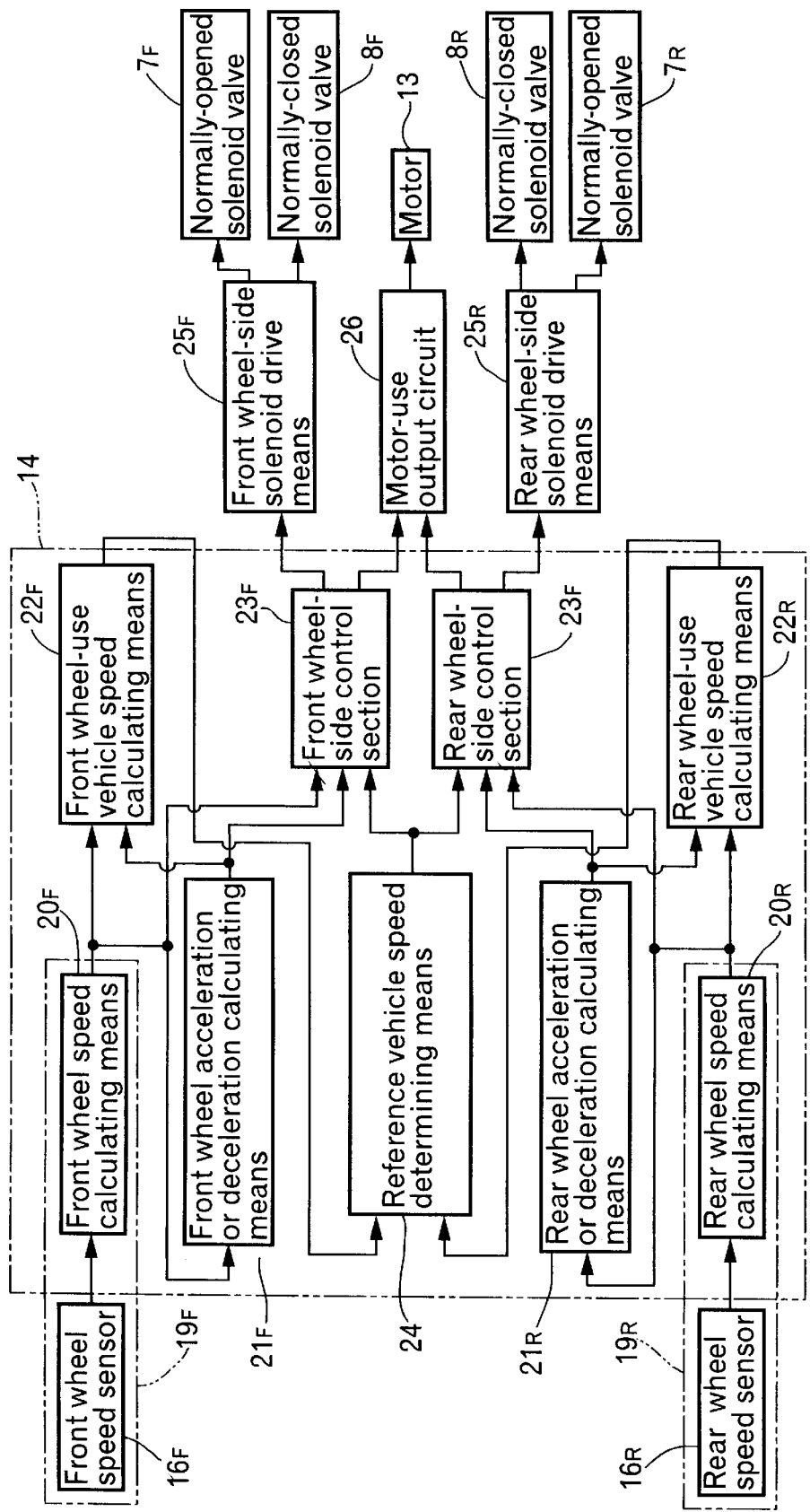
FIG. 2 is a block diagram illustrating the arrangement of a control unit.

The construction of a section associated with an antilock brake control will be described with reference to FIG. 2. The control unit 14 includes a front wheel speed calculating means $20_F$, a front wheel acceleration or deceleration calculating means $21_F$, a front wheel-use vehicle speed calculating means $22_F$ and a front wheel-side control section $23_F$ in correspondence to the front wheel braking liquid pressure regulating means $3_F$, and includes a rear wheel speed calculating means $20_R$, a rear wheel acceleration or deceleration calculating means $21_R$, a rear wheel-use vehicle speed calculating means $22_R$ and a rear wheel-side control section $23_R$ in correspondence to the rear wheel braking liquid pressure regulating means $3_R$. Further, the control unit 14 includes a reference vehicle speed determining means 24 as a vehicle speed presuming means common to both the braking liquid pressure regulating means $3_F$ and $3_R$.

The control quantity determined in the front wheel-side control section $23_F$ is inputted to a front wheel-side solenoid drive means $25_F$, and the normally-opened and closed solenoid valves $7_F$ and $8_F$ of the front wheel braking pressure regulating means $3_F$ are opened and closed by the front wheel-side solenoid drive means $25_F$. On the other hand, the control quantity determined in the rear wheel-side control section $23_R$ is inputted to a rear wheel-side solenoid drive means $25_R$, and the normally-opened and closed solenoid valves $7_R$ and $8_R$ of the rear wheel braking pressure regulating means $3_R$ are opened and closed by the rear wheel-side solenoid drive means $25_R$. Further, the motor 13 common to both the braking fluid pressure regulating means $3_F$ and $3_R$ is driven by a motor driving means 26 in response to the application of a control quantity suitable for carrying out the antilock brake control from the front and rear wheel-side control sections $23_F$ and $23_R$ to the motor driving means 26.

The front wheel speed calculating means $20_F$ calculates a front wheel speed under a reception of the output signal from the front wheel speed sensor $16_F$, and constitutes a front wheel speed detecting means $19_F$ together with the front wheel speed sensor $16_F$. The rear wheel speed calculating means $20_R$ calculates a rear wheel speed under a reception of the output signal from the rear wheel speed sensor $16_R$, and constitutes a rear wheel speed detecting means $19_R$ together with the rear wheel speed sensor $16_R$.

The wheel acceleration or deceleration calculating means $21_F$ and $21_R$, the vehicle speed calculating means $22_F$ and $22_R$ as well as the front and rear wheel-side control sections $23_F$ and $21_R$ have the same function, respectively. Therefore, only the front wheel acceleration or deceleration calculating means $21_F$, the front wheel-use vehicle speed calculating means $22_F$ and the front wheel-side control section $23_F$ will be described hereinafter, and the description of the rear wheel acceleration or deceleration calculating means $21_R$, the rear wheel-use vehicle speed calculating means $22_R$ and the rear wheel-side control section $23_R$ is omitted.

The front wheel acceleration or deceleration calculating means $21_F$ differentiates the front wheel speed calculated in the front wheel speed calculating means $20_F$ in the front wheel speed detecting means $19_F$ to provide a front wheel acceleration or deceleration.

The front wheel-use vehicle speed calculating means $22_F$ calculates a front wheel-use presumed vehicle speed based on the front wheel speed detected by the front wheel speed detecting means $19_F$ and the front wheel acceleration or deceleration calculated in the front wheel acceleration or deceleration calculating means $21_F$. The presumed vehicle speed is calculated according to a processing procedure shown in FIG. 3.

Figure 3:
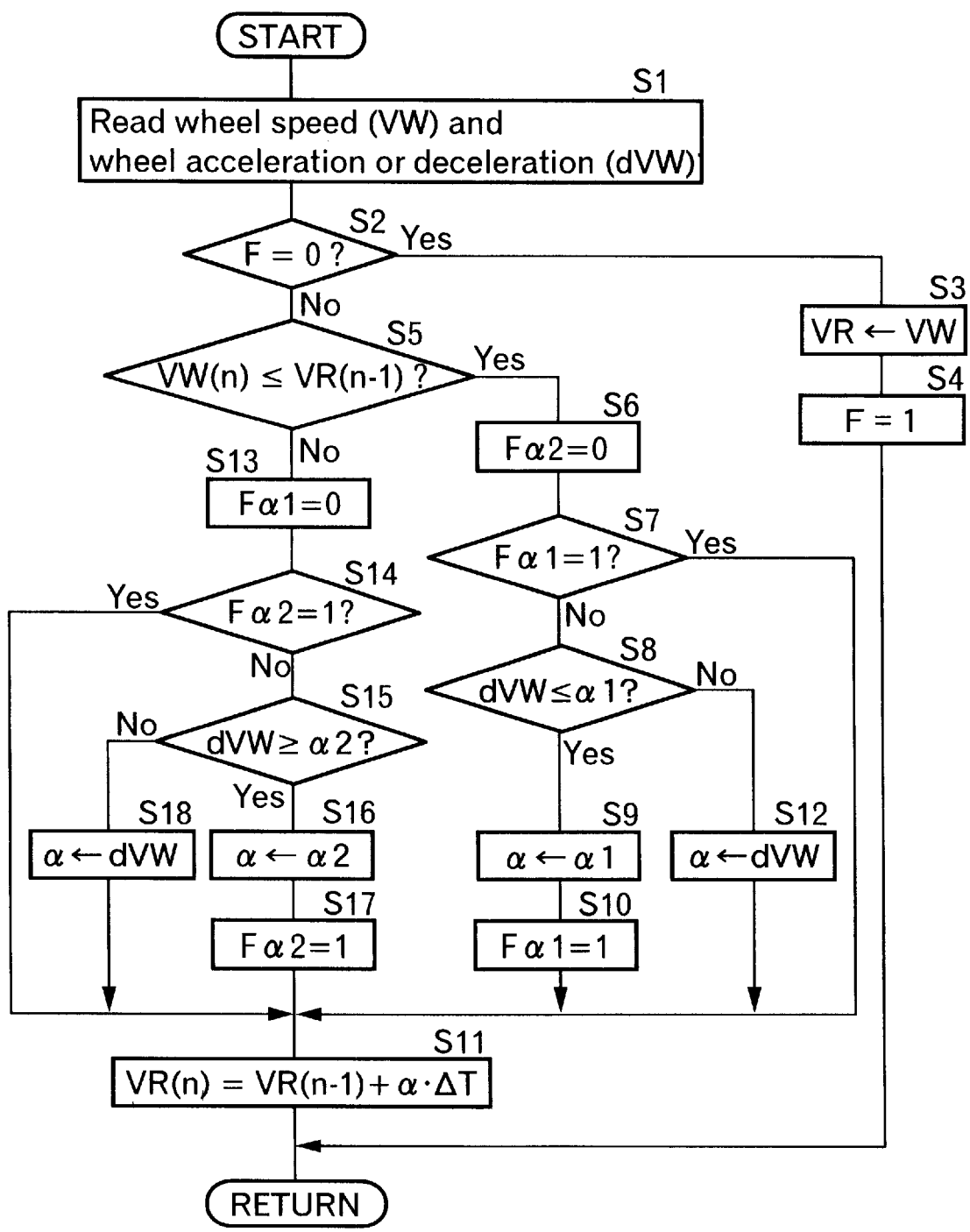
FIG. 3 is a flow chart illustrating a vehicle speed presuming procedure.

At step S1 in FIG. 3, a front wheel speed VW detected by the front wheel speed detecting means $19_F$ and a front wheel acceleration or deceleration dVW calculated by the front wheel acceleration and deceleration calculating means $21_F$ are read. At step S2, it is determined whether a flag F is equal to "0". If F=0, the front wheel speed VW is determined as a presumed vehicle speed VR at step S3, and then, the flag F is set at "1" at step S4. The steps S1 to S4 are processing steps at the start of the calculation of the presumed vehicle speed. Thus, in a next calculating cycle, F=1 and hence, the processing is advanced from step S2 to step S5.

At step S5, it is determined whether a current wheel speed VW(n) is equal to or smaller than a last presumed vehicle speed VR(n−1), i.e., whether the front wheel speed is in a constant or reducing course. If it is determined that the front wheel speed is in the constant or reducing course, the processing is advanced to step S6, at which it is determined whether dVW≦α1, i.e., whether the deceleration of the front wheel speed is equal to or larger than a preset deceleration al (for example, −1G). If VW(n)≦VR(n−1), i.e., when it can be determined that the front wheel speed is in the constant or reducing course, the processing is advanced to step S6, at which a flag Fα2 is set at "0". At next step S7, it is determined whether Fα1=1. The flag Fα1 assumes "1" when the acceleration or deceleration is set at the preset deceleration al in the reducing course. In a first processing cycle, Fα1=0 and hence, the processing is advanced from step S7 to step S8.

At step S8, it is determined whether dVW≦α1, i.e., the deceleration of the front wheel speed is equal to or larger than the preset deceleration α1. If dVW≦α1, the acceleration or deceleration a is set at the preset deceleration α1 at step S9, and the flag Fα1 is set at "1" at step S10, progressing to step S11.

At step S11, the calculation of the presumed vehicle speed VR is carried out. If the last presumed vehicle speed is represented by VR(n−1) and the calculating cycle time is represented by ΔT (for example, 3 msec), the current presumed vehicle speed VR(n) is calculated according to the following equation:

$$VR(n)=VR(n-1)+\alpha \cdot \Delta T$$

If it is determined at step S8 that dVW>α1, the acceleration or deceleration a is determined at the front wheel acceleration or deceleration dVW at step S12, progressing to step S11. If it is determined at step S7 that Fα1=1, the processing is advanced from step S7 to step S11. That is, when the front wheel acceleration or deceleration dVW is equal to or larger than the preset deceleration al in the front wheel speed reducing course, the calculation of the presumed vehicle speed VR is carried out based on the assumption of the fact that the vehicle speed is being reduced at the preset deceleration α1 in the subsequent reducing course.

If it is determined at step S5 that VW(n)>VR(n−1), i.e., the front wheel speed is in an increasing course, the processing is advanced from step S5 to step S13, at which the flag Fα1 is set at "0". Then, it is determined at step S14 whether a flag Fα2 is equal to 1. The flag Fα2 assumes "1" when the acceleration or deceleration is a preset acceleration α2 in the increasing course. Thus, in the first processing cycle of the increasing course, Fα2 is equal to 0 and hence, the processing is advanced from step S14 to step S15. At step S15, it is determined whether dVW≧α2, i.e., the acceleration of the front wheel speed is equal to or larger than the preset acceleration α2. If dVW≧α2, the acceleration or deceleration α is set at the preset acceleration α2 at step S16, and the flag Fα2 is set at "1" at step S17, progressing to step S11. If dVW<α2, the acceleration or deceleration α is set at the front wheel acceleration or deceleration dVW at step S18, progressing to step S11. If it is determined that Fα2=1 at step S15, the processing is advanced directly to step S11. In other words, if the front wheel acceleration or deceleration dVW is equal to or larger than the preset acceleration α2 in the front wheel speed increasing course, the calculation of the presumed vehicle speed VR is carried out on the assumption that the vehicle speed is being increased at the preset acceleration α2 in the subsequent increasing course.

Figure 4:
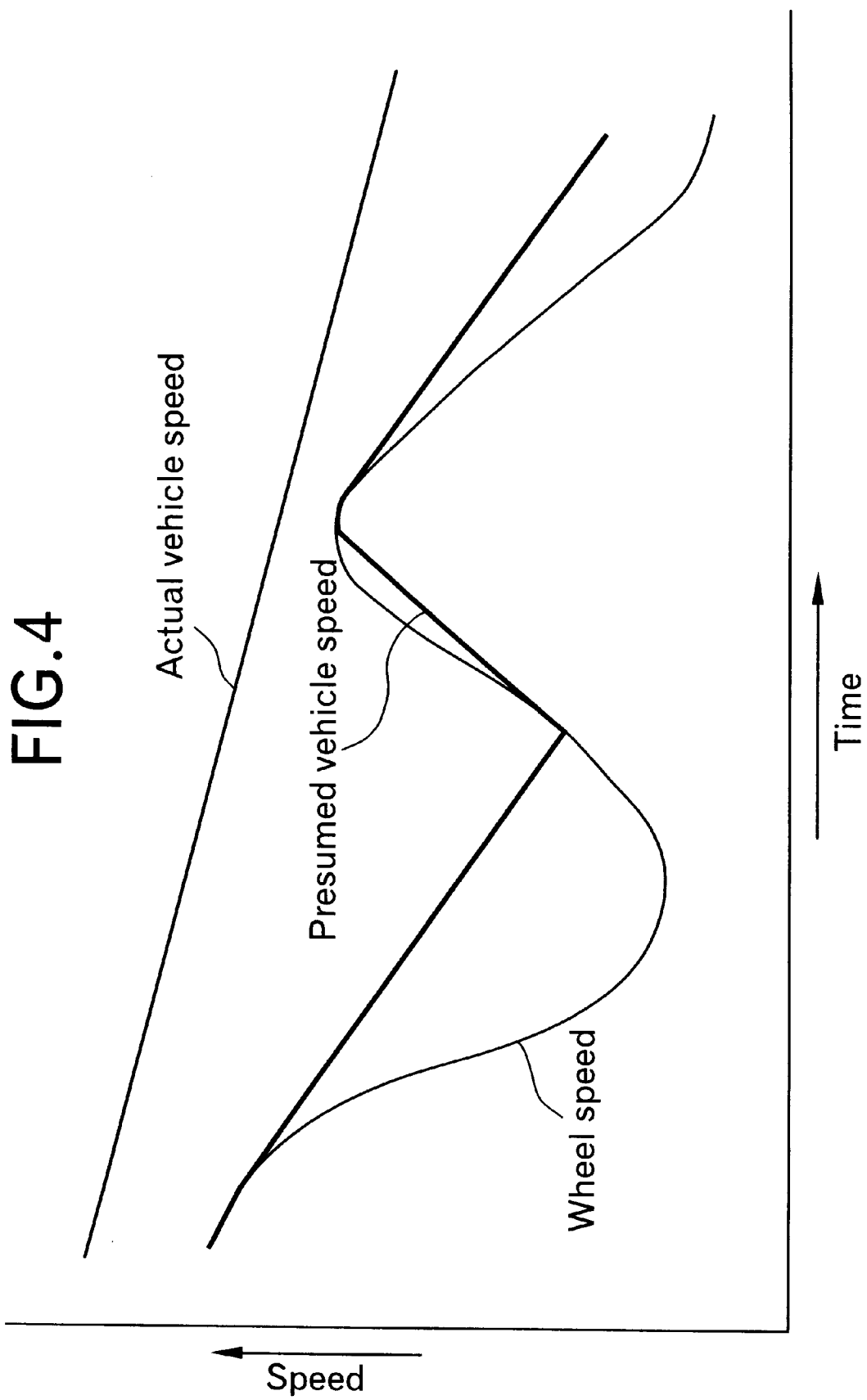
FIG. 4 is a diagram for explaining a process for calculating a presumed vehicle speed based on a wheel speed.

According to such calculation in the front wheel-use vehicle speed calculating means $22_F$, the presumed vehicle speed is as shown in FIG. 4. In the front wheel speed reducing course, the presumed vehicle speed VR is calculated using the deceleration of the front wheel speed, so that it does not become a deceleration equal to or larger than the preset deceleration α1. In the front wheel speed increasing course, the presumed vehicle speed VR is calculated using the acceleration of the front wheel speed, so that it does not become an acceleration equal to or larger than the preset acceleration α2.

Thus, the preset acceleration α2 is, for example, +1G, but may be set at a larger value during the antilock brake control and may be varied in accordance with the vehicle deceleration.

The reference vehicle speed determining means 24 determines a presumed vehicle speed which is a criterion for determining slip rates of the front and rear wheels, based on the front wheel-use presumed vehicle speed calculated in the front wheel-use vehicle speed calculating means $22_F$ and the rear wheel-use presumed vehicle speed calculated in the rear wheel-use vehicle speed calculating means $22_R$. For example, a high select value of the front wheel-use presumed vehicle speed calculated in the front wheel-use vehicle speed calculating means $22_F$ and the rear wheel-use presumed vehicle speed calculated in the rear wheel-use vehicle speed calculating means $22_R$ is determined as a reference presumed vehicle speed.

The front wheel-side control section $23_F$ determines braking fluid pressure control quantities for the front wheel brakes $B_{F1}$ and $B_{F2}$, based on the front wheel speed detected by the front wheel speed detecting means $19_F$, the front wheel acceleration or deceleration calculated in the front wheel acceleration or deceleration calculating means $21_F$ and the presumed vehicle speed determined in the reference vehicle speed determining means 24. The front wheel-side control section $23_F$ is constructed as shown in FIG. 5.

Figure 5:
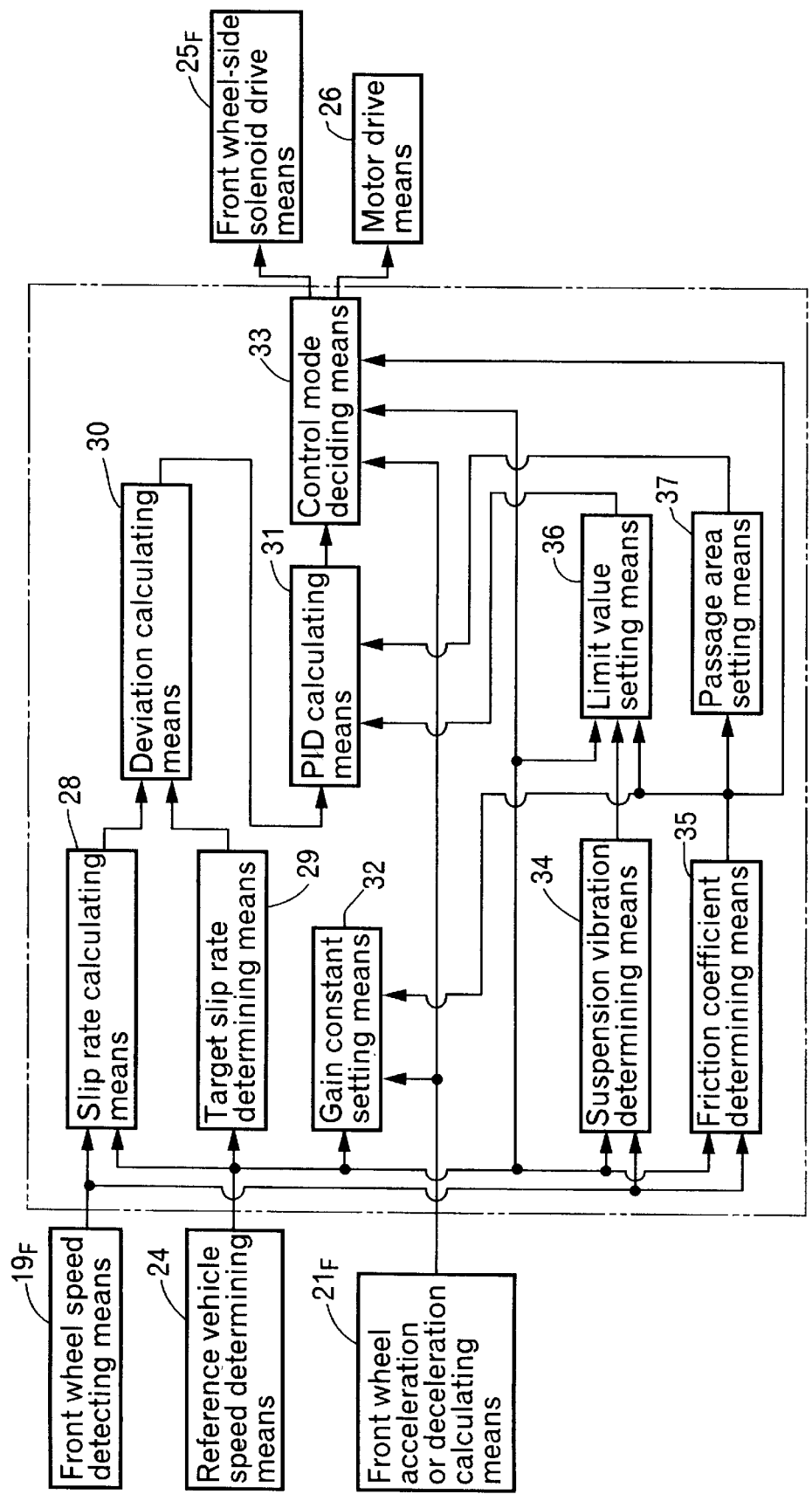
FIG. 5 is a block diagram illustrating the arrangement of a front wheel control section.

Referring to FIG. 5, the front wheel-side control section $23_F$ includes a slip rate calculating means 28, a target slip rate setting means 29, a deviation calculating means 30, a PID calculating means 31, a gain constant setting means 32, a control mode deciding means 33, a suspension vibration determining means 34, a friction coefficient determining means 35, a limit value setting means 36, and a passage area setting means 37.

The slip rate calculating means 28 calculates a slip rate of the front wheel based on the wheel speed detected by the front wheel speed detecting means $19_F$ and the presumed vehicle speed determined in the reference vehicle speed determining means 24. That is, if the slip rate is represented by SR; the presumed vehicle speed is represented by VR; and the front wheel speed is represented by VW, the slip rate SR is calculated by the slip rate calculating means 28 according to the following equation:

$$SR=(VR-VW)/VR$$

In the target slip rate setting means 29, the slip rate as a target during traveling of the vehicle at the presumed vehicle speed is set as a target slip rate SRobj, based on the presumed vehicle speed determined in the reference vehicle speed determining means 24. In the deviation calculating means 30, a deviation ΔS (=SRobj−SR) between the target slip rate SRobj determined in the target slip rate setting means 29 and the slip rate SR calculated in the slip rate calculating means 28 is calculated.

The presumed vehicle speed determined in the reference vehicle speed determining means 24 and the front wheel speed detected by the front wheel speed detecting means $19_F$ are inputted to the suspension vibration determining means 34. The suspension vibration determining means 34 determines a vibrated state of a suspension based on the presumed vehicle speed and the front wheel speed.

The presumed vehicle speed determined in the reference vehicle speed determining means 24 and the front wheel speed detected by the front wheel speed detecting means $19_F$ are inputted to the friction coefficient determining means 35. The friction coefficient determining means 35 determines a friction coefficient of a road surface by comparison of the vehicle deceleration calculated based on the presumed vehicle speed and the front wheel speed with a preset value.

The presumed vehicle speed determined in the reference vehicle speed determining means 24, the front wheel acceleration or deceleration calculated in the front wheel acceleration or deceleration calculating means $21_F$ and a result of the determination of the friction coefficient in the friction coefficient determining means 35 are inputted to the gain constant setting means 32. The gain constant setting means 32 sets a proportional calculation gain constant Kp, an integration calculation gain constant Ki and a differentiation calculation gain constant Kd in a PID calculation in the PID calculating means 31. These gain constants Kp, Ki and Kd are each set in the form of a function of the presumed vehicle speed determined in the reference vehicle speed determining means 24 in the following manner:

$$Kp=fp(VR)$$

$$Ki=fi(VR)$$

$$Kd=fd(VR)$$

Moreover, the gain constant setting means 32 is arranged to change the functions fp(VR), fi(VR) and fd(VR) determining the gain constants Kp, Ki and Kd in accordance with the front wheel acceleration or deceleration calculated in the front wheel acceleration or deceleration calculating means $21_F$ and a result of the determination of the friction coefficient in the friction coefficient determining means 35.

The PID calculating means 31 performs a PID calculation represented by the following equation based on the deviation ΔS calculated in the deviation calculating means 30 and the gain constants Kp, Ki and Kd set by the gain constant setting means 32 to provide a PID calculation value Kpid:

$$Kpid=Kp \times \Delta S+Ki \times \Sigma \Delta S+Kd \times \{\Delta S(n-3)-\Delta S(n)\}.$$

Specifically, in the PID calculating means 31, the following calculating operations are carried out: a proportional operation for multiplying the deviation ΔS by the gain constant Kp; an integrating operation for multiplying a sum of products ΣΔS of the deviations ΔS by the gain constant Ki; a differentiating operation for multiplying a difference between the deviation ΔS(n−3) determined a predetermined time ago (e.g., the last but two times ago) and the current deviation ΔS(n) by the gain constant Kd; and an adding operation for adding values resulting from the above operations.

The PID calculating means 31 is arranged to limit the PID calculation value Kpid within a predetermined limit value, to limit the values provided by the proportional operation, the integrating operation and the differentiating operation constituting the PID calculation to mutually independent predetermined limit values, or to limit a difference between the last PID calculation value Kpid and the current PID calculation value Kpid to a predetermined limit value.

Specifically, to limit the PID calculation value Kpid within the predetermined limit value, the PID calculation value Kpid is compared with the limit value. If Kpid>the limit value, the PID calculation value Kpid outputted from the PID calculating means 31 is equal to the limit value. If Kpid≦the limit value, the PID calculation value outputted from the PID calculating means 31 is equal to Kpid.

Moreover, the limit value used in the PID calculating means 31 is determined by a limit value determining means 36. The limit value determining means 36 is arranged to determine the limit value based on the presumed vehicle speed determined in the reference speed determining means 24, the result of the determination of the vibration by the suspension vibration determining means 34 and the result of the determination of the friction coefficient of the road surface by the friction coefficient determining means 35.

Further, the PID calculating means 31 has a low-pass filter function to permit the passage of a lower frequency component of the PID calculation value Kpid, or to permit the passage of a lower frequency component of the calculation values resulting from the proportional operation, the integrating operation and the differentiating operation constituting the PID calculation. For example, to permit the passage of the lower frequency component of the PID calculation value Kpid, a filter processing is carried out according to the following equation:

$$Kpid(n)=Kpid(n-1)+\{Kpid(n-1)-Kpid(n)\}/N$$

wherein N represents a filter degree. The passage area of the low-pass filter, i.e., the filter degree N is set by a passage area setting means 37. In the passage area setting means 37, the filter degree N is set in the form of a function of the presumed vehicle speed determined in the reference vehicle speed determining means 24 according to the following equation:

$$N=fN \cdot (VR)$$

An output from the PID calculating means 31 is inputted to the control mode deciding means 33. The control mode deciding means 33 decides a control mode by comparing the PID calculation value Kpid inputted thereto from the PID calculating means 31 with threshold values $K_1$ and $K_2$ on a previously established map, and applies a control value for controlling the operation of the braking fluid pressure regulating means $3_F$ in the decided control mode to the front wheel-side solenoid drive means $25_F$.

The above-described map is established as shown in FIG. 6. A plurality of areas of a pressure-reducing mode, a maintaining mode and a pressure-increasing mode determined by the threshold values $K_1$ and $K_2$ varied depending upon the presumed vehicle speed determined in the reference vehicle speed determining means 24 are prepared depending upon the result of the determination of the road surface friction coefficient by the friction coefficient determining means 35. Moreover, the threshold values $K_1$ and $K_2$ are varied depending upon whether the wheel speed is being decreased or increased. When the wheel speed is being decreased, the threshold values $K_1$ and $K_2$ are set as shown by dashed lines in FIG. 6. When the wheel speed is being increased, the threshold values $K_1$ and $K_2$ are set as shown by solid lines in FIG. 6. Thus, the threshold values $K_1$ and $K_2$ are set slightly larger when the wheel speed is being decreased than those when the wheel speed is being increased.

On the basis of this map, the pressure-reducing mode is selected when $Kpid \leq K_1$; the maintaining mode is selected when $K_1 < Kpid \leq K_2$; and the pressure-increasing mode is selected when $K_2 < Kpid$. In the pressure-reducing mode, the normally-closed solenoid valve $8_F$ is controlled in the braking fluid pressure regulating means $3_F$, so that it is opened with a predetermined duty in a condition in which the normally-opened solenoid valve $7_F$ is in its closed state. In the maintaining mode, both of the normally-opened solenoid valve $7_F$ and the normally-closed solenoid valve $8_F$ are closed. In the pressure-increasing mode, the normally-opened solenoid valve $7_F$ is controlled so that it is opened with a predetermined duty in a condition in which the normally-closed solenoid valve $8_F$ is in its closed state.

Further, when the amount of variation in PID calculation value Kpid within a predetermined time exceeds a predetermined value, the control mode deciding means 33 selects the control mode different from that decided by the current PID calculation value Kpid. The amount of variation in PID calculation value Kpid within the predetermined time may be determined, for example, by calculating a difference $\Delta K$ between the current PID calculation value Kpid(n) and the PID calculation value Kpid(n−1) determined a predetermined time ago (e.g., at the last time), or by differentiating the PID calculating value Kpid. For example, when the difference $\Delta K$ exceeds a predetermined positive value, the control mode is changed in a sequence of pressure-reducing mode→maintaining mode→pressure-increasing mode. When the difference $\Delta K$ exceeds a predetermined negative value in a negative direction, the control mode is changed in a sequence of pressure-increasing mode→maintaining mode→pressure-reducing mode.

The operation of this embodiment will be described with reference to FIGS. 7 to 13. As the wheel speed, the actual vehicle speed and the target wheel speed are varied as shown in FIG. 7A, the deviation $\Delta S$ (=SRobj−SR) between the target slip rate SRobj set in the target slip rate setting means 29 and the slip rate SR calculated in the slip rate calculating means 28 is varied as shown in FIG. 7B. Further, as the PID calculation value Kpid calculated in the PID calculating means 31 is varied as shown in FIG. 7C, the control mode as shown in FIG. 7D is selected in the control mode deciding means 33, and in accordance with this, the braking pressure is varied as shown in FIG. 7E. In other words, the control mode deciding means 33 decides the control mode by comparing the PID calculation value Kpid calculated in the PID calculating means 31 with the threshold values $K_1$ and $K_2$ on the previously established map, and controls the operation of the braking fluid pressure regulating means $3_F$ in the decided control mode. Thus, it is possible to control the braking pressure in a simple structure using the normally-opened solenoid valves $7_F$ and $7_R$ and the normally-closed solenoid valves $8_F$ and $8_R$ which are inexpensive on-off operated solenoid valves as solenoid valves each constituting a portion of each of the braking fluid pressure regulating means $3_F$ and $3_R$, thereby preventing the wheel from being fallen into a locked state.

Moreover, in the control mode deciding means 33, the plurality of maps are prepared depending upon the result of the determination of the road surface friction coefficient by the friction coefficient determining means 35, in which the threshold values $K_1$ and $K_2$ are varied in accordance with the presumed vehicle speed determined in the reference vehicle speed determining means 24 to define the areas of the control modes. Thus, the control mode suitable for variations in vehicle speed and road surface friction coefficient can be selected to perform an effective antilock brake control.

The threshold values $K_1$ and $K_2$ during reducing of the wheel speed are set as shown by the dashed lines in FIG. 7C, whereas the threshold values $K_1$ and $K_2$ during increasing of wheel speed are set slightly smaller than that during decreasing as shown by the solid line in FIG. 7C. By the fact that the threshold values $K_1$ and $K_2$ are changed depending upon whether the wheel speed is being reduced or increased, the pressure-reducing mode is selected early during reducing of the wheel speed, and the pressure increasing mode is selected early during increasing of the wheel speed. Thus, it is possible to select the control mode appropriately corresponding to the behavior of the wheel speed.

Further, in the control mode deciding means 33, when the PID calculating value Kpid is varied to exceed a predetermined value in a positive direction, e.g., the difference $\Delta K$ between the current PID calculation value Kpid(n) and the PID calculation value Kpid(n−1) determined a predetermined time ago (e.g., at the last time) exceeds a positive predetermined value, the control mode is changed in a sequence of pressure-reducing mode→maintaining mode→pressure increasing mode. When the PID calculation value Kpid is varied to exceed a predetermined negative value in a negative direction, e.g., the difference $\Delta K$ exceeds a predetermined negative value in a negative direction, the control mode is changed in a sequence of pressure-increasing mode→maintaining mode→pressure reducing mode. In this case, an excessive control or a control delay cannot occur. That is, when the PID calculation value Kpid is varied as shown in FIG. 8B as the wheel speed, the actual vehicle speed and the target wheel speed are varied as shown in FIG. 8A, the difference $\Delta K$ of the PID calculation values Kpid is provided as shown in FIG. 8C. When the difference $\Delta K$ exceeds a predetermined positive value, as well as when the difference $\Delta K$ exceeds a predetermined negative value, the control mode is changed as shown by a solid line in FIG. 8D. In other words, even if the control mode decided by the PID calculation value Kpid calculated in the PID calculating means 31 is not changed, the control mode is changed when the amount of variation in PID calculation value Kpid within a predetermined time is larger. Therefore, it is possible to perform an appropriate antilock brake control in which an excessive control or a control delay cannot occur. On the contrast, when the control mode is decided by only the PID calculation value Kpid, the control mode is changed as shown by a dashed line in FIG. 8D. As a result, if the control mode is established in serious consideration of a continuity in order to smoothly conduct the control, the accommodation to a variation in situation of road surface is liable to be retarded. If the control mode is established in serious consideration of a responsiveness, the control is liable to be excessive. In order to establish data to reconcile the continuity and the responsiveness, detailed data for deciding the control mode are required, resulting in the need for a great deal of labor.

In the PID calculation in the PID calculating means 31, the gain constants Kp, Ki and Kd in the proportional, integrating and differentiating operations are each set in the gain constant setting means 32 in the form of the function fp(VR), fi(VR), fd(VR) of the presumed vehicle speed determined in the reference vehicle speed determining means 24. Therefore, the appropriate gain constants Kp, Ki and Kd corresponding to the vehicle travel speed can be reflected to the PID calculation. Moreover, the functions fp(VR), fi(VR) and fd(VR) are changed based on the result of the determination of the friction coefficient in the friction coefficient determining means 35 and the result of the calculation of the wheel acceleration or deceleration in the wheel acceleration or deceleration calculating means $21_F$ and $21_R$. Therefore, a stable antilock brake control can be performed by carrying out the control of the braking pressure by providing a PID calculation value appropriately corresponding to the friction coefficient of a travel road surface and the wheel acceleration or deceleration.

Figure 9A:
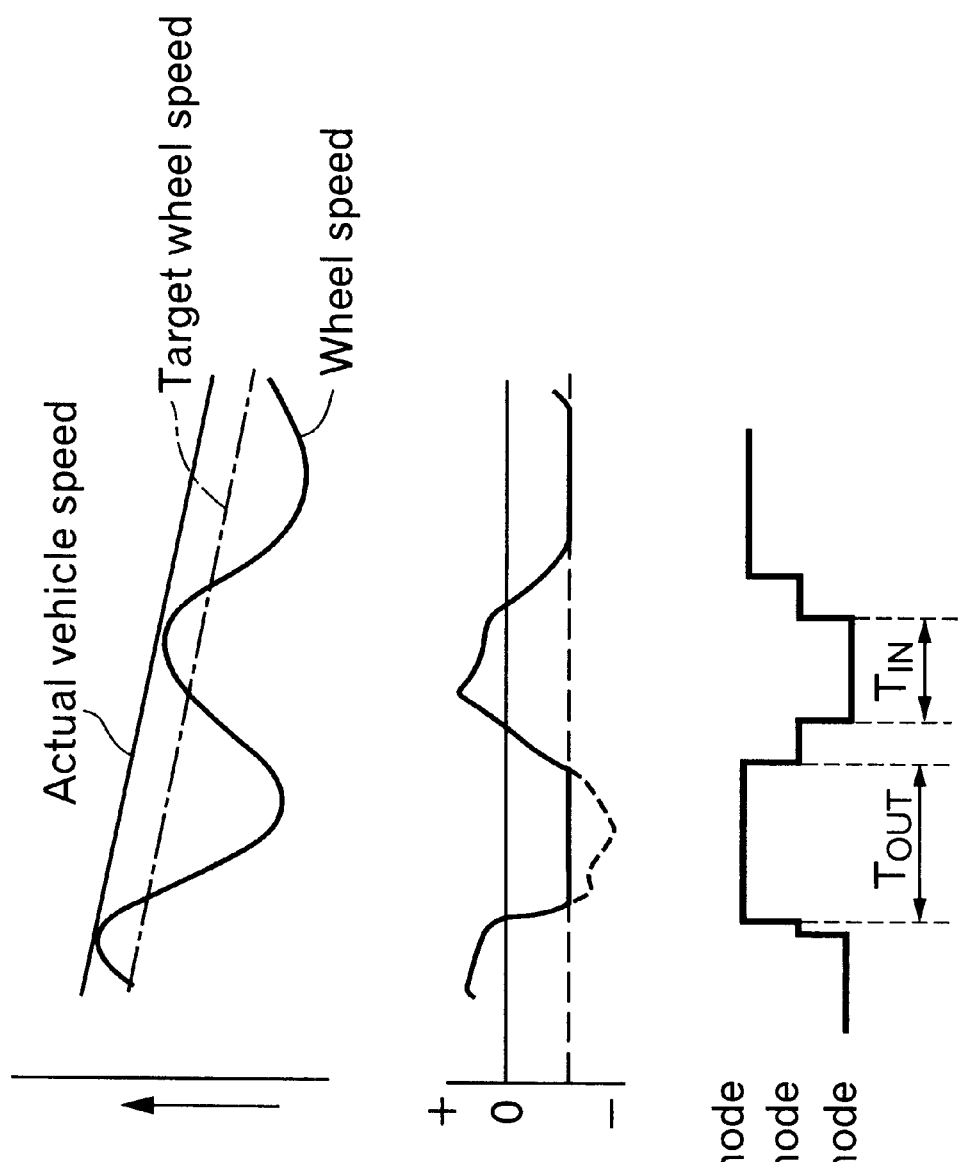
FIGS. 9A and 9B are diagrams illustrating a timing chart when a PID calculation value has been limited by a limit value, in contrast with that when the calculation value has not been limited.
Figure 9B:
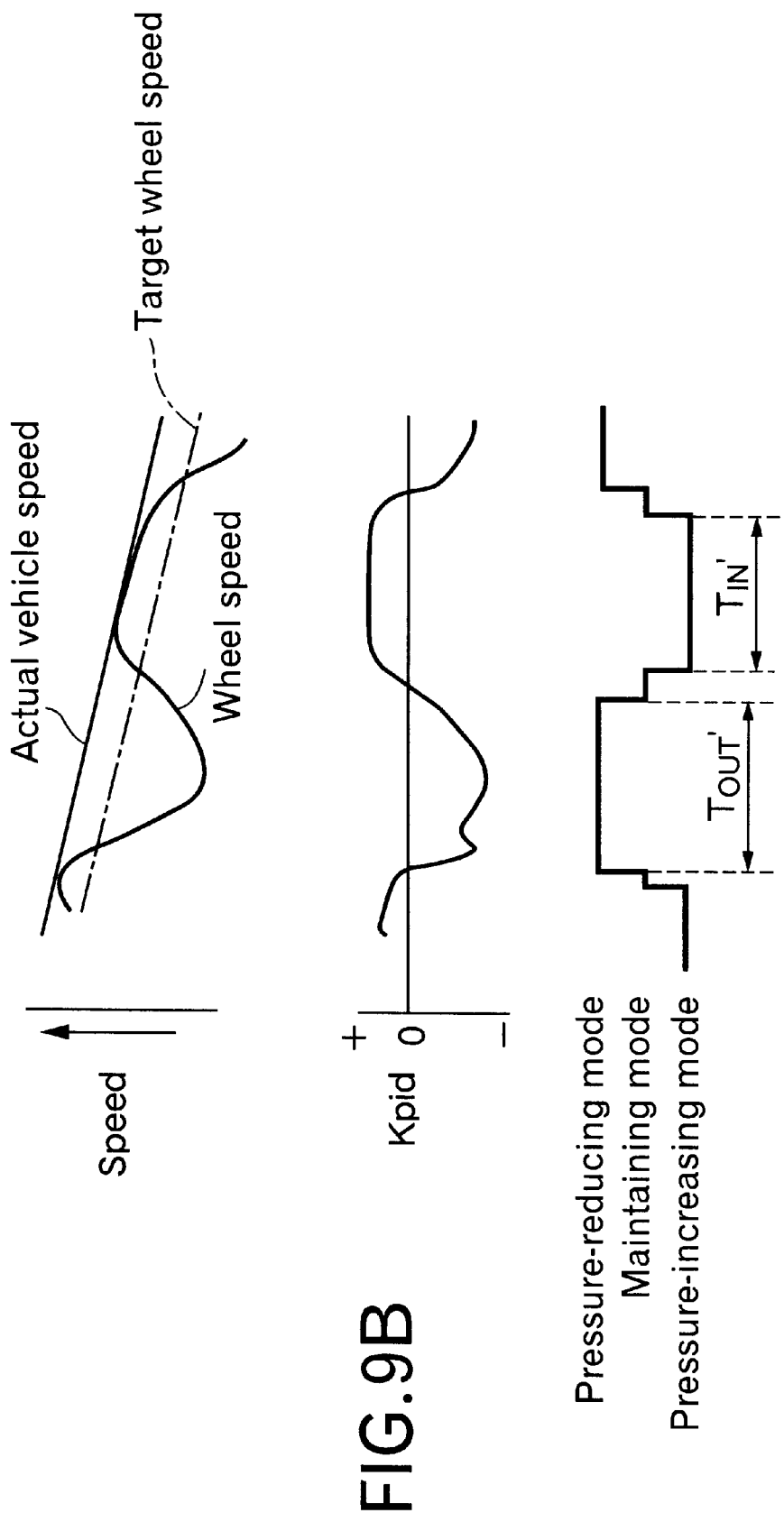

In the PID calculating means 31, the PID calculation value is limited within the predetermined limit value, or the calculation values provided by the proportional, integrating and differentiating operations constituting the PID calculation are limited to the mutually independent limit values, respectively, or the difference between the last PID calculation value and the current PID calculation value is limited to the predetermined limit value. When the PID calculation value Kpid is limited within the predetermined limit value, the inversion of the PID calculation value Kpid is hastened by the limit value, as shown in FIG. 9A, so that the time duration $T_{OUT}$ of the pressure-reducing mode is relatively shortened, and the time duration $T_{IN}$ of the pressure-increasing mode is also shortened and further, the start of the pressure-increasing mode is hastened. On the contrast, when the PID calculation value Kpid is not limited within the predetermined limit value, the time duration $T_{OUT}'$ of the pressure-reducing mode is relatively prolonged, as shown in FIG. 9B, and in accordance with this, the time duration $T_{IN}'$ of the pressure-increasing mode is also relatively prolonged, and the start of the pressure-increasing mode is retarded. Therefore, even if the PID calculation value Kpid is too large due to the generation of a noise around the calculation system or the like, the difference between a wheel-slipping state assumed in the calculation system and an actual wheel-slipping state can be relatively reduced, thereby avoiding the occurrence of a delay of the braking pressure control even if a sudden variation occurs in the wheel-slipping state due to a variation in road surface friction coefficient or the like, thus enhancing the control followability.

Figure 10A:
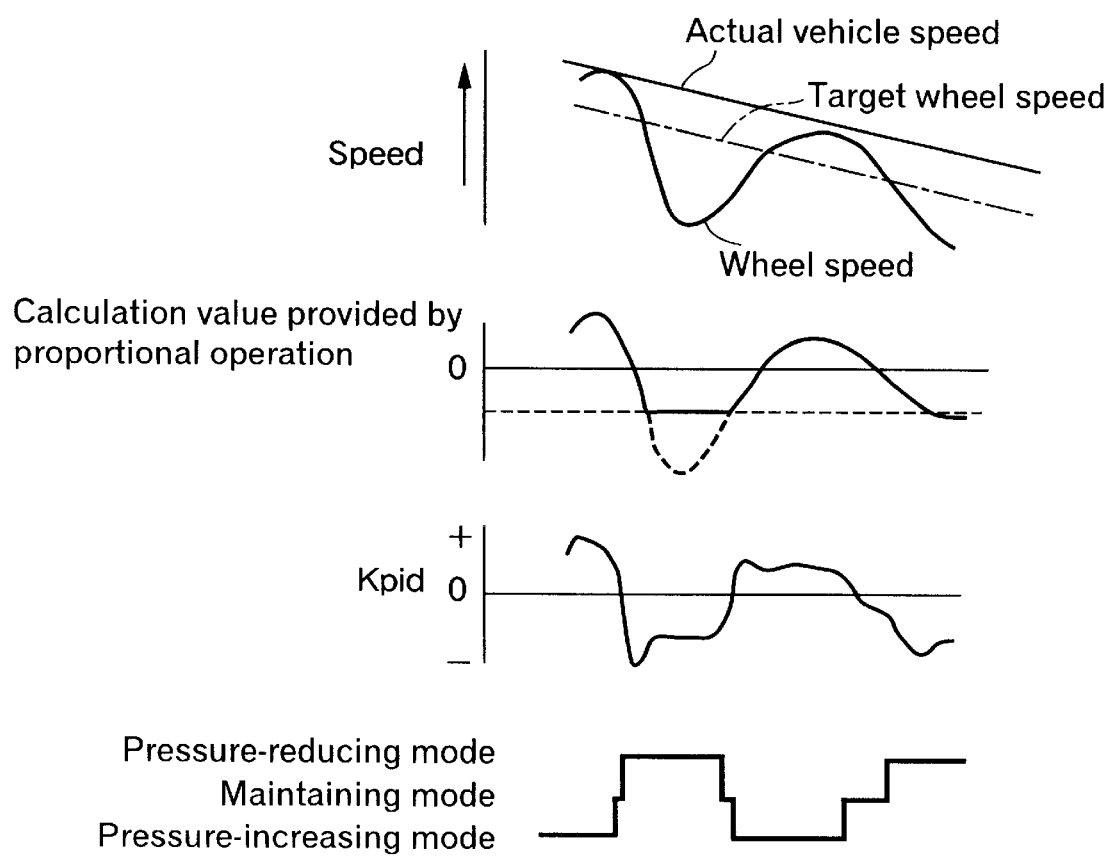
FIGS. 10A and 10B are diagrams illustrating a timing chart when a calculation value provided by a proportional operation has been limited by a limit value, in contrast with that when the calculation value has not been limited.
Figure 10B:
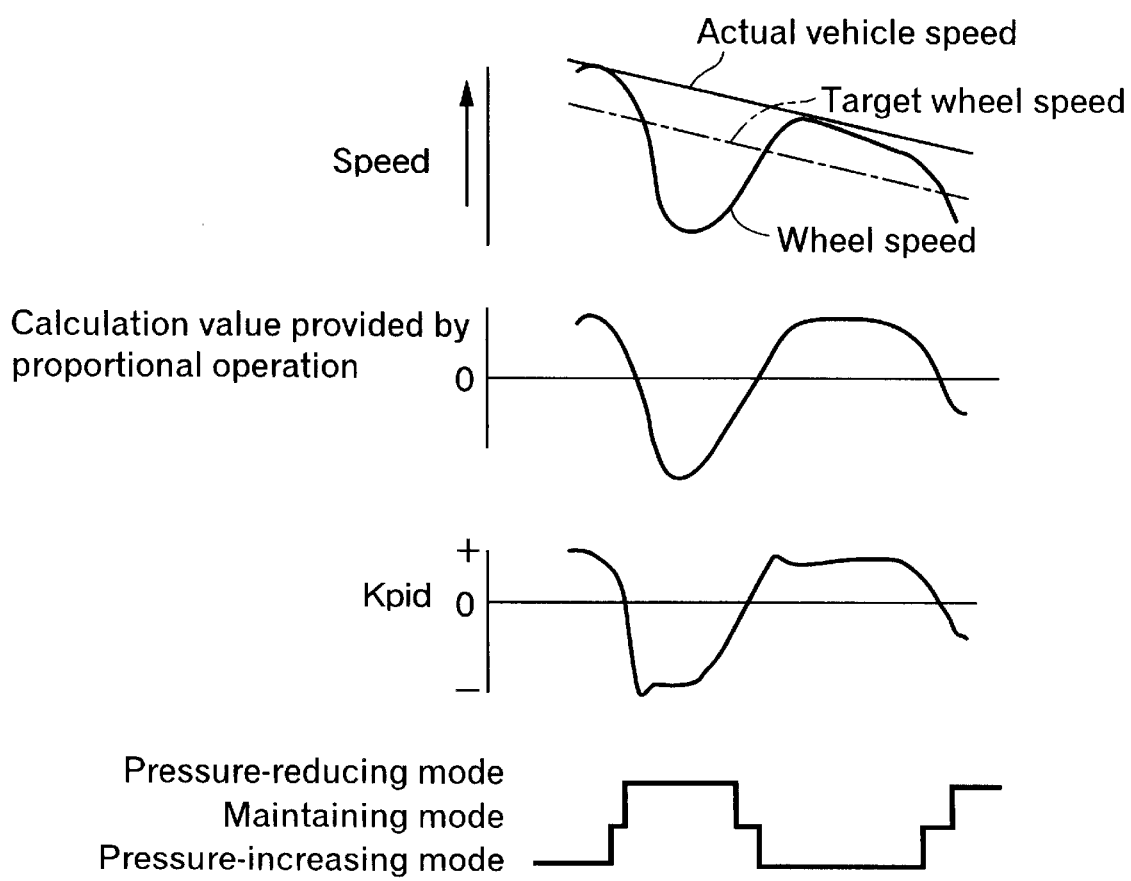
Figure 11A:
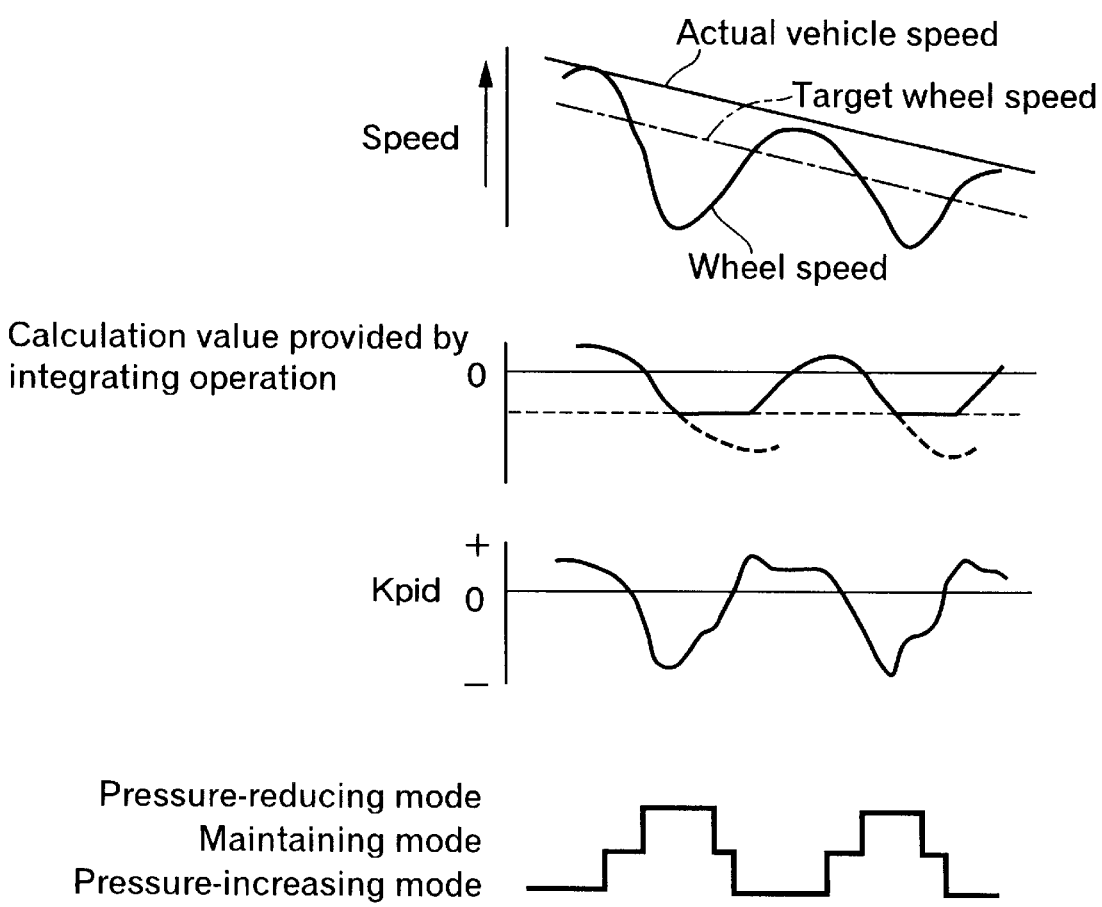
FIGS. 11A and 11B are diagrams illustrating a timing chart when a calculation value provided by an integrating operation has been limited by a limit value, in contrast with that when the calculation value has not been limited.
Figure 11B:
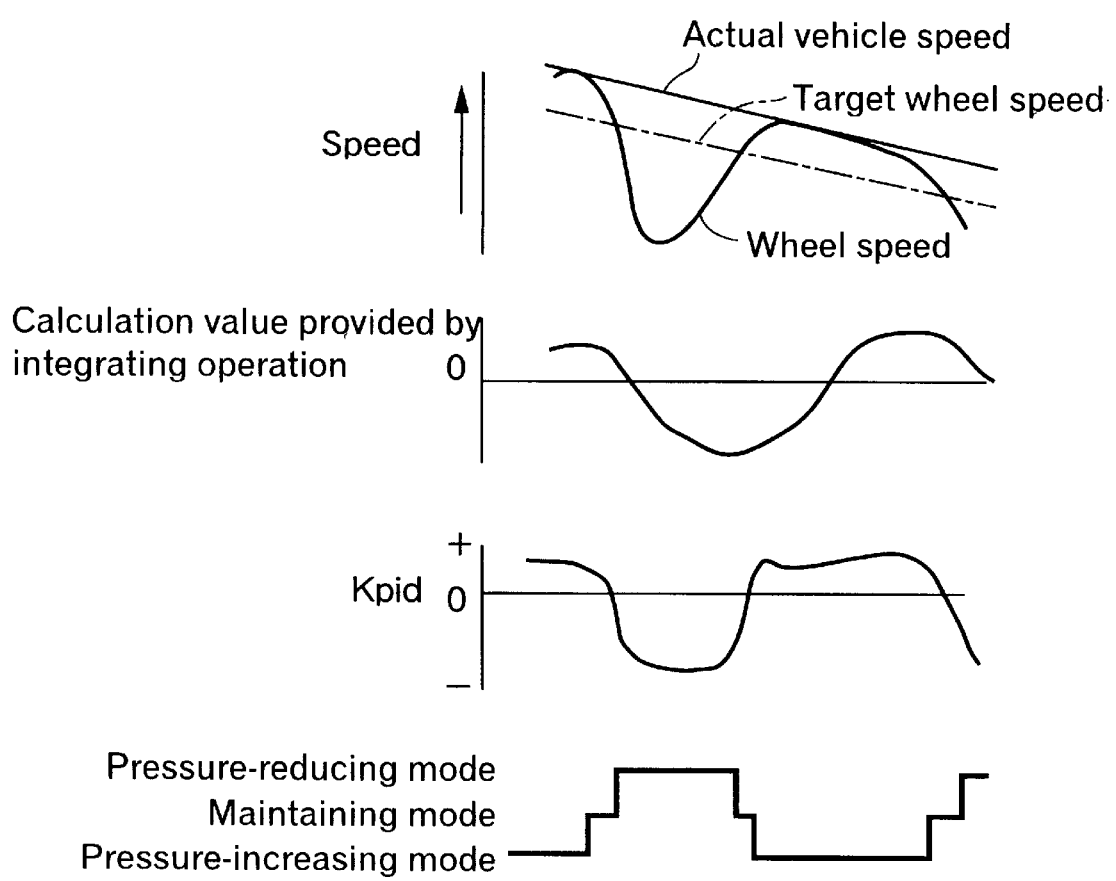

When the calculation values provided by the proportional, integrating and differentiating operations constituting the PID calculation are limited to the mutually independent predetermined limit values, respectively, these calculation values are limited as shown in FIGS. 10, 11 and 12, respectively. If the proportional calculation value (Kp×ΔS) is limited by the limit value as shown in FIG. 10A, the PID calculation value Kpid is less enlarged, as compared with the case where the PID calculation value Kpid is enlarged when the proportional calculation value (Kp×ΔS) is not limited as shown in FIG. 10B. Thus, a possibility of an excessive control is eliminated. If the calculation value (Ki×ΣΔS) provided by the integration is limited by the limit value, as shown in FIG. 11A, the inversion of the PID calculation value Kpid is hastened, which can contribute to an enhancement in control followability. Specifically, in the case of the non-limited condition shown in FIG. 11B, the integration calculation term representing the continuity of the intrinsic control is too large, so that the proportion thereof occupied for the PID calculation value Kpid is increased. As a result, when a sudden reduction or a sudden increase in wheel speed occurs due to a variation in a friction coefficient of a road surface or the like, the PID calculation value Kpid is delayed from the state of the actual wheel speed, bringing about a degradation in control followability. Further, if the calculation value {Kd×(ΔS(n−3)−ΔS(n)} provided by the differentiation is limited by the limit value, as shown in FIG. 12A, even if a chattering of the wheel speed is produced, the influence of the chattering can be avoided to perform a sufficient pressure increasing, thereby stabilizing the control. When the vehicle is traveling on a bad road, or when the vehicle has run over a protrusion on a road surface, a wheel speed having a wave form caused by a vibration of the wheel or the vehicle body may be different from an actual wheel speed and inputted to the calculation system. When the calculation value provided by the differentiation is not limited, as shown in FIG. 12B, the differentiation term intrinsically improving the followability is excessively reflected to the PID calculation value Kpid, resulting in an excessive control to bring about a degradation in riding comfort.

Further, when the difference between the last PID calculation value Kpid(n−1) and the current PID calculation value Kpid(n) is limited to the predetermined limit value, it is possible to avoid the generation of a large variation in PID calculation value Kpid, thereby enhancing the control followability and stabilizing the control.

In the PID calculating means 31, the filter process for permitting the passage of a lower frequency component of the PID calculation value Kpid, or the filter process permitting the passage of a lower frequency component of the calculation values provided by the proportional, integrating and differentiating operations constituting the PID calculation is carried out in addition to the above-described limiting process.

A characteristic provided when the filter process permitting the passage of the lower frequency component of the PID calculation value Kpid has been carried out is shown by a solid line in FIG. 13. A characteristic provided when such filter process has not been carried out is shown by a dashed line in FIG. 13. As the wheel speed, the actual vehicle speed and the target wheel speed are varied as shown in FIG. 13A, the deviation ΔS, the PID calculation value Kpid, the control mode and the braking pressure are varied as shown in FIGS. 13B to 13E. As apparent from FIG. 13, when the filter process has not been carried out, a chattering of the wheel speed, if it has been produced, is reflected, as it is, to the PID calculation value, resulting in an unstable control. On the contrast, the control can be stabilized by carrying out the filter process to enhance the riding comfort.

Although the embodiment of the present invention has been described in detail, it will be understood that the present invention is not limited to the above-described embodiment, and various modifications in design can be made without departing from the spirit and scope of the invention defined in claims.

For example, the control mode has been divided into three types of the pressure-reducing, maintaining and increasing modes in the embodiment, but may be subdivided into more modes, for example, a rapid pressure-reducing mode, a slow pressure-reducing mode, a maintaining mode, a slow pressure-increasing mode and a rapid pressure-increasing mode. In addition, the present invention is not limited to the motorcycle, and is applicable to a four-wheel automotive vehicle.

What is claimed is:

1. An antilock brake control system in a vehicle, comprising wheel speed detecting means for detecting a wheel speed, a vehicle speed presuming means for presuming a vehicle speed based on the wheel speed detected by said wheel speed detecting means, a slip rate calculating means for calculating a slip rate based on the wheel speed detected by said wheel speed detecting means and the presumed vehicle speed determined in said vehicle speed presuming means, a target slip rate determining means for determining a target slip rate based on said presumed vehicle speed determined in said vehicle speed presuming means, a deviation calculating means for calculating a deviation between the target slip rate determined in said target slip rate determining means and the slip rate calculated in said slip rate calculating means, and a PID calculating means for carrying out a PID calculation based on the deviation determined in said deviation calculating means, a result of a calculation in said PID calculating means being used to control an operation of a braking liquid pressure regulating means, wherein the antilock brake control system further includes a control mode deciding means for deciding a control mode for controlling a braking pressure, based on a result of comparison of a PID calculation value determined in said PID calculating means with a predetermined threshold value to control the operation of the braking liquid pressure regulating means, and for selecting another control mode different from a control mode decided from a current PID calculation value, when the amount of variation in said PID calculation value within a predetermined time exceeds a predetermined value.

2. An antilock brake control system in a vehicle according to claim 1, further including a gain constant setting means for setting a gain constant used in the calculation in said PID calculating means as a function of the presumed vehicle speed determined in said vehicle speed presuming means.

3. An antilock brake control system in a vehicle according to claim 2, further including wheel acceleration or deceleration calculating means for differentiating the wheel speed detected by the wheel speed detecting means to provide a wheel acceleration or deceleration, and a friction coefficient determining means for determining a friction coefficient of a road surface by comparing a vehicle deceleration calculated based on the presumed vehicle speed determined in said vehicle speed presuming means and the wheel speed detected by said wheel speed detecting means, with a preset threshold value, wherein said gain constant setting means is arranged to change said function in accordance with the wheel acceleration or deceleration calculated in said wheel acceleration or deceleration calculating means and a result of determination in said friction coefficient determining means.

4. An antilock brake control system in a vehicle according to claim 1, further including a friction coefficient determining means for determining a friction coefficient of a road surface by comparing a vehicle deceleration calculated based on the presumed vehicle speed determined in said vehicle speed presuming means and the wheel speed detected by said wheel speed detecting means, with a preset threshold value, wherein said control mode deciding means has a plurality of maps previously established therein, said maps defining areas of a plurality of control modes for every result of the determination in said friction coefficient determining means.

5. An antilock brake control system in a vehicle according to claim 4, wherein said areas of the control modes in said maps are defined by a threshold value for mode determination which is varied in accordance with the presumed vehicle speed determined in said vehicle speed presuming means.

6. An antilock brake control system in a vehicle according to claim 4, wherein said threshold value for mode determination is set at different values depending upon whether the wheel speed is being increased or decreased.

7. An antilock brake control system in a vehicle according to claim 1, wherein said braking liquid pressure regulating means includes a reservoir, a normally-opened solenoid valve mounted between a wheel brake and a master cylinder, a normally-closed solenoid valve mounted between said reservoir and said wheel brake, and a return pump having an inlet connected to said reservoir and an outlet connected to said master cylinder.

* * * * *